United States Patent
Fukumoto et al.

(10) Patent No.: US 7,141,328 B2
(45) Date of Patent: Nov. 28, 2006

(54) FUEL CELL

(75) Inventors: Hisatoshi Fukumoto, Tokyo (JP);
Osamu Hiroi, Tokyo (JP); Kenro Mitsuda, Tokyo (JP); Hideo Maeda, Tokyo (JP); Yasuhiro Yoshida, Tokyo (JP); Tatsuya Hayashi, Tokyo (JP); Akihisa Yoshimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 411 days.

(21) Appl. No.: 10/216,434

(22) Filed: Aug. 12, 2002

(65) Prior Publication Data

US 2003/0044672 A1    Mar. 6, 2003

(30) Foreign Application Priority Data

Aug. 31, 2001   (JP)   .............................. 2001-263484

(51) Int. Cl.
*H01M 4/86*  (2006.01)
*H01M 4/90*  (2006.01)

(52) U.S. Cl. ............................................. 429/41; 44/30
(58) Field of Classification Search ................. 429/30, 429/40–44
See application file for complete search history.

(56) References Cited

U.S. PATENT DOCUMENTS

| | | | | |
|---|---|---|---|---|
| 5,039,389 A | * | 8/1991 | McMichael | 204/282 |
| 5,441,822 A | * | 8/1995 | Yamashita et al. | 429/34 |
| 5,989,741 A | * | 11/1999 | Bloomfield et al. | 429/32 |
| 6,485,855 B1 | * | 11/2002 | Fukuda et al. | 429/30 |
| 6,492,295 B1 | * | 12/2002 | Hitomi et al. | 502/159 |
| 6,713,207 B1 | * | 3/2004 | Tsusaka et al. | 429/40 |
| 6,916,573 B1 | * | 7/2005 | Trabold et al. | 429/39 |

FOREIGN PATENT DOCUMENTS

| | | | |
|---|---|---|---|
| EP | 654837 A1 | * | 5/1995 |
| JP | 5-6773 | | 1/1993 |
| JP | 05190184 A | * | 7/1993 |
| WO | WO 96/24958 | * | 8/1996 |
| WO | WO 03/100882 | * | 12/2003 |

* cited by examiner

*Primary Examiner*—Tracy Dove
(74) *Attorney, Agent, or Firm*—Leydig, Voit & Mayer, Ltd.

(57) ABSTRACT

A fuel cell includes an electrolyte membrane, an anode on one surface of the electrolyte membrane and having an anode catalyst layer that is supplied with fuel and contains a platinum-ruthenium alloy catalyst, and a cathode on the other surface of the electrolyte membrane and having an cathode catalyst layer that is supplied with air and contains a platinum catalyst. The anode catalyst layer and the cathode catalyst layer include divided catalyst segments, and gaps between the divided catalyst segments that are adjacent to each other.

16 Claims, 12 Drawing Sheets

FUEL CELL

CROSS REFERENCE TO RELATED APPLICATION

This application is based on Application No. 2001-263484, filed in Japan on Aug. 31, 2001, the contents of which are hereby incorporated by reference.

BACKGROUND OF THE INVENTION

1. Field of the Invention

The present invention relates to a fuel cell, and more particularly, to a solid polymer type fuel cell.

2. Description of the Related Art

A fuel cell has a pair of electrodes communicating via an electrolyte. One of the electrodes is supplied with fuel and the other is supplied with an oxidant for electrochemically reacting with the fuel, whereby chemical energy is directly converted to electric energy. More specifically, hydrogen gas that is fuel for a fuel cell is supplied to one electrode (anode), and oxygen that is an oxidant is supplied to the other electrode (cathode) so as to effect a reaction represented by the following Chemical Formulae (1) and (2) in the respective electrodes, whereby an electromotive force is generated.

Anode: $H_2 \rightarrow 2H^+ + 2e^-$ (1)

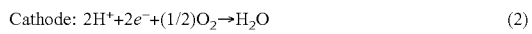

Cathode: $2H^+ + 2e^- + (1/2)O_2 \rightarrow H_2O$ (2)

In recent years, as a fuel cell from which a high output is obtained, a solid polymer type fuel cell using a solid polymer electrolyte membrane as an electrolyte is attracting attention. For example, FIG. 8 is a cross-sectional view schematically showing a structure of main portions of a conventional fuel cell. In FIG. 8, a fuel cell 101 includes an electrolyte membrane 102, an anode 103 that is in contact with one surface of the electrolyte membrane 102 and is supplied with hydrogen (fuel), and a cathode 104 that is in contact with the other surface of the electrolyte membrane 102 and is supplied with air containing oxygen (oxidant). The anode 103 includes an anode catalyst layer 105 and a fuel-side gas diffusion layer 106 (e.g. carbon paper) that is in contact with the anode catalyst layer 105 to disperse hydrogen. The cathode 104 also includes an cathode catalyst layer 107 and an air-side gas diffusion layer 108 (e.g. carbon paper) that is in contact with the cathode catalyst layer 107 to disperse air. Furthermore, the fuel cell 101 includes fuel-side bipolar plates 110 made of carbon having a fuel channel 109 that is in contact with the fuel-side gas diffusion layer 106 to supply hydrogen to the anode 103, and air-side bipolar plates 112 made of carbon having an air channel 111 that is in contact with the air-side gas diffusion layer 108 to supply air to the cathode 104.

The electrolyte membrane 102 is made of, for example, a perfluorosulfonic acid polymer that is a solid polymer electrolyte membrane. One side of the electrolyte membrane 102 is coated with the anode catalyst layer 105 mixed with, for example, a platinum-ruthenium alloy catalyst, and the other side thereof is coated with the cathode catalyst layer 107 mixed with, for example, a platinum catalyst. In addition, a fuel gasket 113 for preventing leakage of hydrogen is disposed between the electrolyte membrane 102 and the fuel-side bipolar plates 110 around the anode 103. An air gasket 114 for preventing leakage of air is disposed between the electrolyte membrane 102 and the air-side bipolar plates 112 around the cathode 104.

The fuel cell 101 with the above-mentioned structure is produced as follows. First, carbon black powder with a platinum-ruthenium alloy (e.g. atomic ratio between platinum and ruthenium is 1:1) adhering to the surface thereof is mixed with an alcohol solution of a solid polymer electrolyte of perfluorosulfonic acid type to prepare an ink for an anode catalyst layer. Carbon black powder with platinum adhering to the surface thereof is also mixed with an alcohol solution of a solid polymer electrolyte of perfluorosulfonic acid type to prepare an ink for a cathode catalyst layer. The ink for the anode catalyst layer and the ink for the cathode catalyst layer are applied to two polytetrafluoroethylene sheets (hereinafter, referred to as "PTFE sheets") by screen printing, respectively. The PTFE sheet coated with the ink for the anode catalyst layer and the PTFE sheet coated with the ink for the cathode catalyst layer are heated to dry each ink. Thereafter, the electrolyte membrane 102 is sandwiched between the two PTFE sheets so that the dried ink for the anode catalyst layer and the dried ink for the cathode catalyst layer come into contact with the respective sides of the electrolyte membrane 102 that is a perfluorosulfonic acid electrolyte membrane (e.g., Nafion film (Trade Name), produced by Dupont). The electrolyte membrane 102 in this state is subjected to hot press in the vicinity of a glass transition temperature of the solid polymer electrolyte membrane, whereby the ink for the anode catalyst layer and the ink for the cathode catalyst layer are heat-sealed to the electrolyte membrane 102. Then, the two PTFE sheets are removed. Consequently, as shown in FIG. 9, the ink for the anode catalyst layer remains as the anode catalyst layer 105 on one side of the electrolyte membrane 102, and the ink for the cathode catalyst layer remains as the cathode catalyst layer 107 on the other side of the electrolyte membrane 102.

Thereafter, the fuel-side gas diffusion layer 106 is overlapped with the anode catalyst layer 105. The fuel gasket 113 is disposed around the anode catalyst layer 105. The fuel-side bipolar plates 110 are overlapped with the fuel-side gas diffusion layer 106 and the fuel gasket 113. Similarly, the air-side gas diffusion layer 108 is overlapped with the cathode catalyst layer 107, and the air gasket 114 is disposed around the cathode catalyst layer 107. The air-side bipolar plates 112 are overlapped with the air-side gas diffusion layer 108 and the air gasket 114. Accordingly, the fuel cell 101 is produced.

Next, an operation of the fuel cell 101 will be described. FIG. 10 is a view schematically illustrating the state in the electrolyte membrane 102 during generation of electric power in a conventional fuel cell. In FIGS. 8 and 10, the anode catalyst layer 105 applied to the electrolyte membrane 102 is supplied with hydrogen gas from the fuel channel 109 via the fuel-side gas diffusion layer 106. The cathode catalyst layer 107 applied to the surface of the electrolyte membrane 102 opposed to the anode catalyst layer 105 is supplied with air from the air channel 111 via the air-side gas diffusion layer 108. When an external load 115 is connected to the anode 103 via the fuel-side bipolar plates 110, and to the cathode 104 via the air-side bipolar plates 112, a hydrogen gas performs the reaction represented by the above-mentioned Formula (1) in the anode catalyst layer 105, due to the platinum-ruthenium alloy of a metal catalyst, and hydrogen ions ($H^+$) are supplied to the electrolyte membrane 102. Electrons (e) generated together with hydrogen ions due to this reaction pass through the external load 115 to reach the cathode 104. The electrolyte membrane 102 contains sufficient water, so that hydrogen ions generated on the side of the anode 103 are hydrated to flow to the cathode 104 while being accompanied by water, and performs the reaction represented by the above-mentioned Formula (2) with electrons and oxygen to generate water. The reaction operation is repeated to allow electrons to move, whereby a current flows to the external load 115.

For example, in the case where the fuel cell 101 is kept at 80° C., the fuel channel 109 is supplied with humidified hydrogen by a bubbler (not shown) kept at 70° C., and the air channel 111 is supplied with humidified air by a bubbler kept at 70° C. (i.e., in the case of a highly humidified state), the following results are obtained: the fuel cell 101 has 0.58 V/unit cell at a current density of 0.5 A/cm². Furthermore, in the case where hydrogen and air are similarly supplied by a bubbler kept at 70° C. with 100 ppm of carbon monoxide contained in the hydrogen, the following results are obtained: the fuel cell 101 has 0.50 V/unit cell at a current density of 0.5 A/cm². Herein, it is assumed that carbon monoxide is contained in fuel (hydrogen), as described below. Furthermore, in the case where humidified hydrogen and air are supplied to the fuel cell 101 kept at 80° C. by a bubbler kept at 60° C. (i.e., in the case of a low humidified state), the following results are obtained: the fuel cell 101 has 0.45 V/unit cell at a current density of 0.5 A/cm².

Thus, as described above, hydrogen ions move accompanied by water in the electrolyte membrane 102, when moving from the anode 103 to the cathode 104. Water is also generated by the reaction of Formula (2) in the cathode 104. Therefore, water is likely to be accumulated in the cathode 104, whereas the anode 103 is likely to be dried due to the movement of water.

When a gradient of a water content is formed due to the movement of water between the anode 103 and the cathode 104, a force of water moving from the cathode 104 to the anode 103 is formed. However, the anode catalyst layer 105 is formed on substantially the entire surface of the electrolyte membrane 102, and the cathode catalyst layer 107 is formed on substantially the entire surface of the electrolyte membrane 102 opposite the anode catalyst layer 105, so that hydrogen ions are hydrated in the electrolyte membrane 102 and move from the anode 103 to the cathode 104, thereby preventing the movement of water from the cathode 104 to the anode 103 due to the gradient of the water content. Furthermore, water accumulated in the cathode 104 passes through the cathode catalyst layer 107 or the air-side gas diffusion layer 108 to be partially discharged to the outside of the fuel cell 101. The cathode 104 is dense, so that discharge of water is insufficient. As a result, water is likely to be accumulated in the cathode 104, and the anode 103 is likely to be dried.

In the case of setting a highly humidified state so as to prevent the anode 103 from being dried, accumulation of water in the cathode 104 is accelerated, and water enters pores in the cathode catalyst layer 107 and the air-side gas diffusion layer 108. Therefore, sufficient air is not supplied to the cathode catalyst layer 107, and the reaction in the cathode 104 is not smoothly effected.

Furthermore, in the case of setting a low humidified state so as to prevent accumulation of water in the cathode 104, drying of the anode 103 is accelerated, and generated hydrogen ions are hydrated and cannot move to the cathode 104. This increases an ion-conduction resistance, and hydrogen ions cannot be sufficiently supplied to the cathode 104.

There is also a method in which movement of water from the cathode 104 to the anode 103 is activated by making the electrolyte membrane 102 thin and increasing the gradient of the water content between the anode 103 and the cathode 104. When the electrolyte membrane 102 becomes thin, there arises a problem of increasing the danger that the electrolyte membrane 102 is damaged.

Furthermore, in general, hydrogen as fuel is generated from manufactured gas, methanol, or the like, so that hydrogen as fuel contains carbon monoxide or the like as a sub-product. Carbon monoxide in hydrogen adsorbs to platinum of a metal catalyst. Therefore, when such fuel is used, the function of platinum as a catalyst is reduced. In order to prevent this, ruthenium is added to the anode catalyst layer 105, and a platinum-ruthenium alloy is used as a metal catalyst. However, as the added amount of ruthenium is increased, the amount of platinum is reduced accordingly. Therefore, in the case where hydrogen containing no carbon monoxide is used as fuel, it is not appropriate to use a catalyst containing a large amount of ruthenium as a metal catalyst. Thus, the composition of an appropriate metal catalyst is varied depending upon the composition of fuel, resulting in a problem in that the anode catalyst layer 105 cannot have sufficient performance, except for the case where a metal catalyst is used for the anode catalyst layer 105, and fuel allowing the metal catalyst to exhibit its function as a catalyst is supplied.

SUMMARY OF THE INVENTION

Therefore, with the foregoing in mind, it is an object of the present invention to provide a highly reliable fuel cell in which accumulation of water in a cathode and drying in an anode are prevented, a change in composition of fuel can be addressed, and an electrolyte membrane is unlikely to be damaged.

According to the present invention, a fuel cell includes an anode provided on a first surface of an electrolyte membrane and having an anode catalyst layer that is supplied with fuel and that contains a metal catalyst, and a cathode provided on a second surface of the electrolyte membrane and having a cathode catalyst layer that is supplied with an oxidant and that contains a metal catalyst. At least one of the anode catalyst layer and the cathode catalyst layer comprises a plurality of divided catalyst segments, and gaps are present between the respective divided catalyst segments. At least one of the anode and cathode catalyst layers includes divided catalyst segments with two different hydrophilicities.

DETAILED DESCRIPTION OF THE PREFERRED EMBODIMENTS

Embodiment 1

Figure 1A:
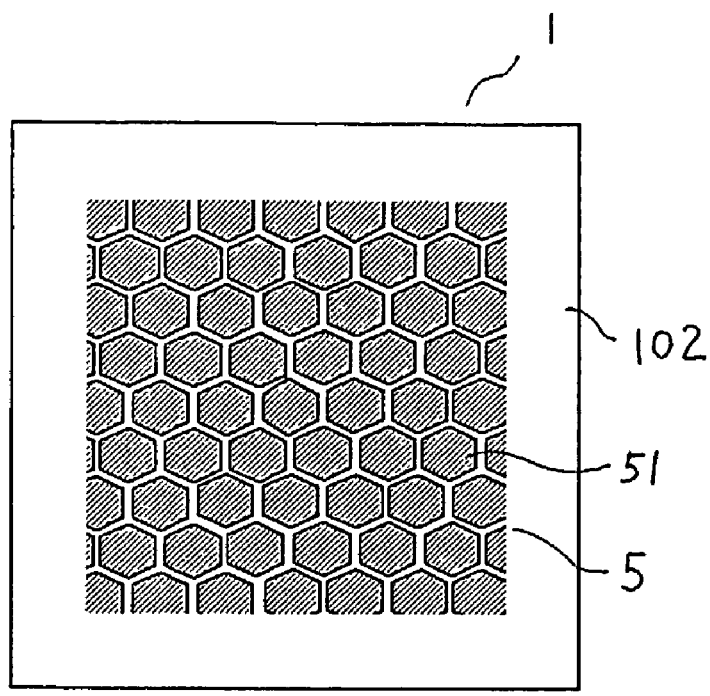
FIG. 1A is a top view schematically showing a structure of main portions of a fuel cell in accordance with Embodiment 1 of the present invention.
Figure 1B:
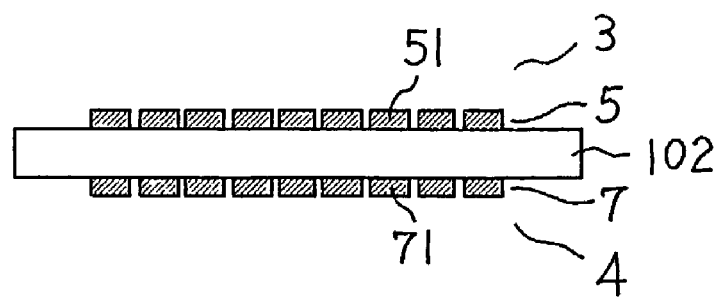
FIG. 1B is a side view thereof.
Figure 8:
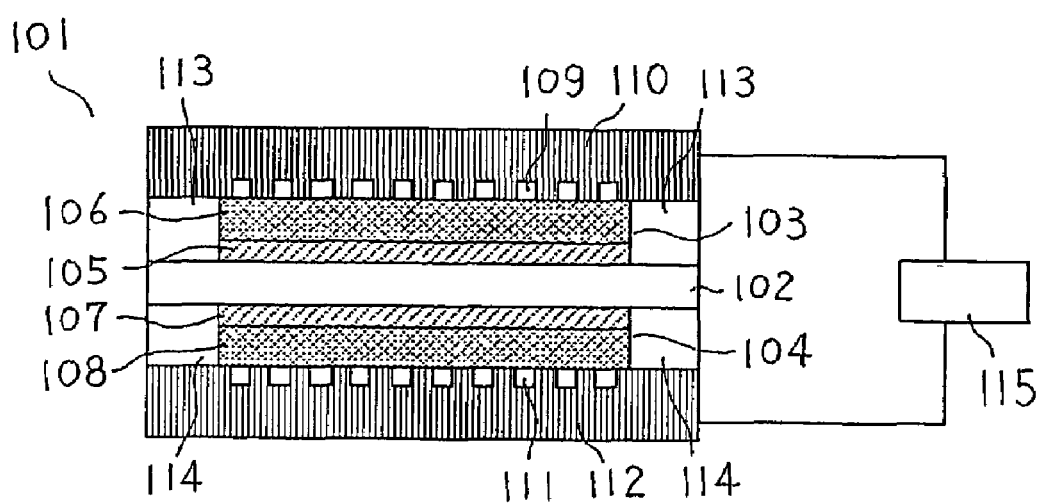
FIG. 8 is a cross-sectional view schematically showing a structure of main portions of a conventional fuel cell.
Figure 9A:
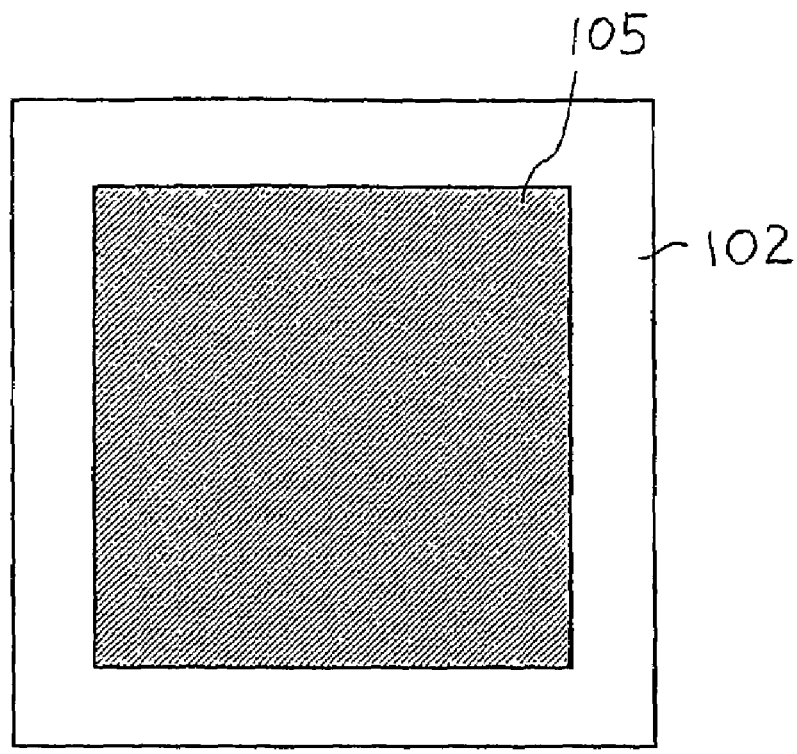
FIG. 9A is a top view schematically showing a state in which an anode catalyst layer and a cathode catalyst layer are applied to the respective surfaces of an electrolyte membrane of a conventional fuel cell.
Figure 9B:
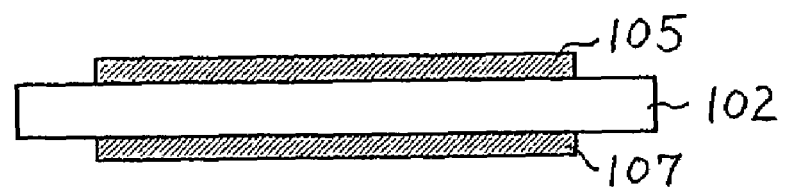
FIG. 9B is a side view thereof.
Figure 10:
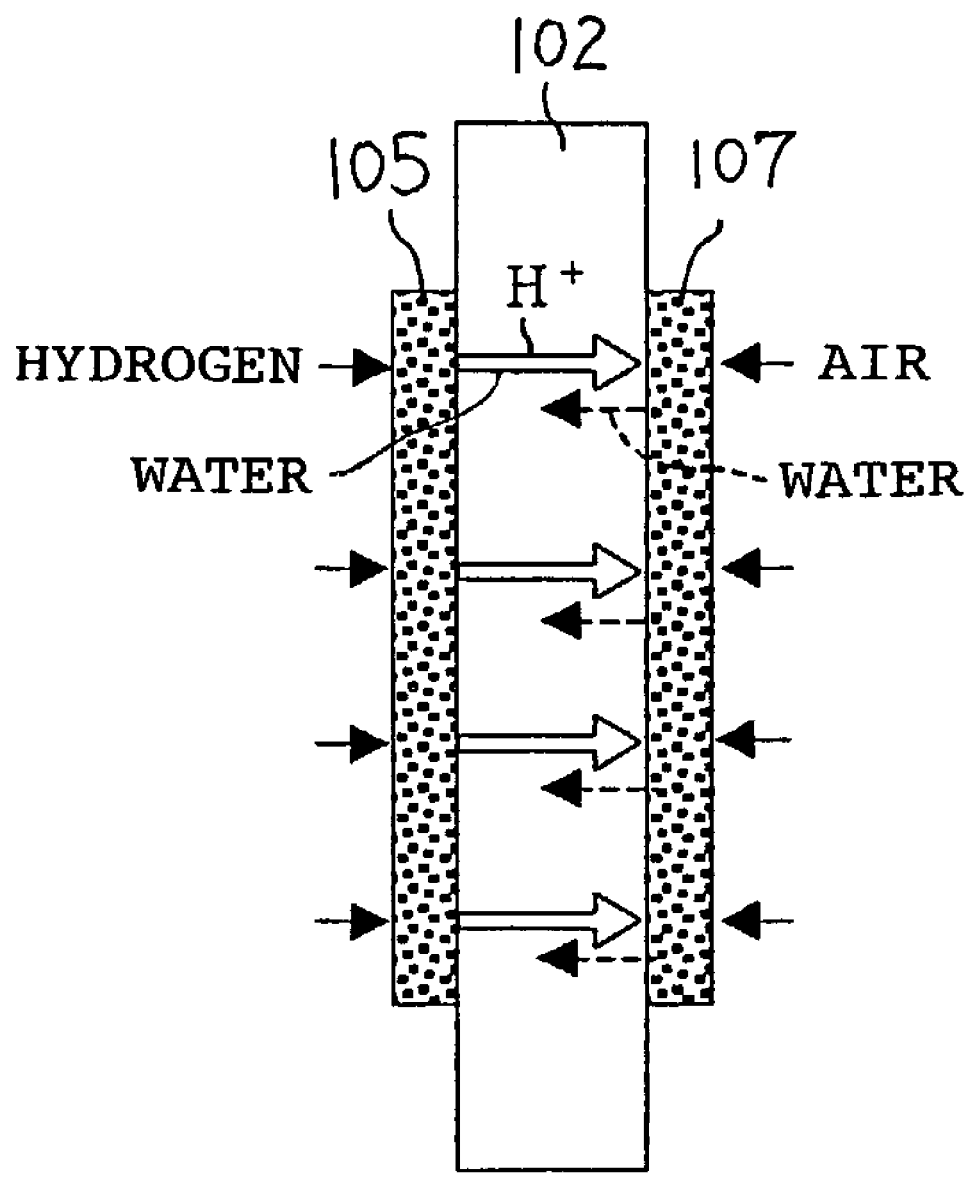
FIG. 10 is a view schematically illustrating a state in an electrolyte membrane during generation of electric power in a conventional fuel cell.

FIGS. 1A and 1B are a top view and a side view, respectively, schematically showing a structure of main portions of a fuel cell of Embodiment 1 according to the present invention. In FIGS. 1A and 1B, a fuel cell 1 includes an electrolyte membrane 102, an anode 3 (corresponding to the anode 103 in FIG. 8) that is in contact with one surface of the electrolyte membrane 102, and a cathode 4 (corresponding to the cathode 104 in FIG. 8) that is in contact with the other surface of the electrolyte membrane 102. The anode 3 includes an anode catalyst layer 5 applied to the electrolyte membrane 102, and a fuel-side gas diffusion layer 106 overlapped with the anode catalyst layer 5. The cathode 4 includes a cathode catalyst layer 7 applied to the electrolyte membrane 102, and an air-side gas diffusion layer 108 overlapped with the cathode catalyst layer 7.

The anode catalyst layer 5 has a plurality of divided catalyst segments 51. The shape of each of the divided catalyst segments 51 is a hexagon, and there is a gap between adjacent divided catalyst segments 51. Herein, the area of each divided catalyst portion 51 is about 0.5 cm$^2$, and the width of the gap is about 0.5 mm. However, the present invention is not limited thereto. The area of the gap between the respective divided catalyst segments 51 can be set arbitrarily in such a range as to prevent the degradation of the performance of a cell. Furthermore, the shape of each of the divided catalyst segments 51 may be a square, a circle, or the like. In each of the divided catalyst segments 51, a platinum-ruthenium alloy as a metal catalyst is mixed with carbon black in the same way as in a conventional example.

The cathode catalyst layer 7 has a plurality of divided catalyst segments 71 in the same way as in the anode catalyst layer 5. The shape of each of the divided catalyst segments 71 also is a hexagon. However, the present invention is not limited thereto. Furthermore, there is a gap between adjacent divided catalyst segments 71. The area of each of the divided catalyst segments 71 is about 0.5 cm$^2$, and the gap therebetween is about 0.5 mm. However, in the same way as in each of the divided catalyst segments 51 of the anode catalyst layer 5, there is no limit thereto. Furthermore, a divided catalyst segment 71 is opposite each of the divided catalyst segments 51. In the divided catalyst segments 71, platinum as a metal catalyst is mixed with a carbon black in the same way as in the conventional example. The other structure is the same as that of the conventional example.

In the fuel cell 1, the electrolyte membrane 102 is coated with the anode catalyst layer 5 and the cathode catalyst layer 7 as follows. In the same way as in the conventional example, an ink for an anode catalyst layer and an ink for a cathode catalyst layer are prepared, and the respective inks are printed onto two PTFE sheets, using a screen provided with masking so that a plurality of hexagonal divided catalyst segments 51 or 71 can be printed. The remaining process is the same as that of the conventional example.

Figure 2:
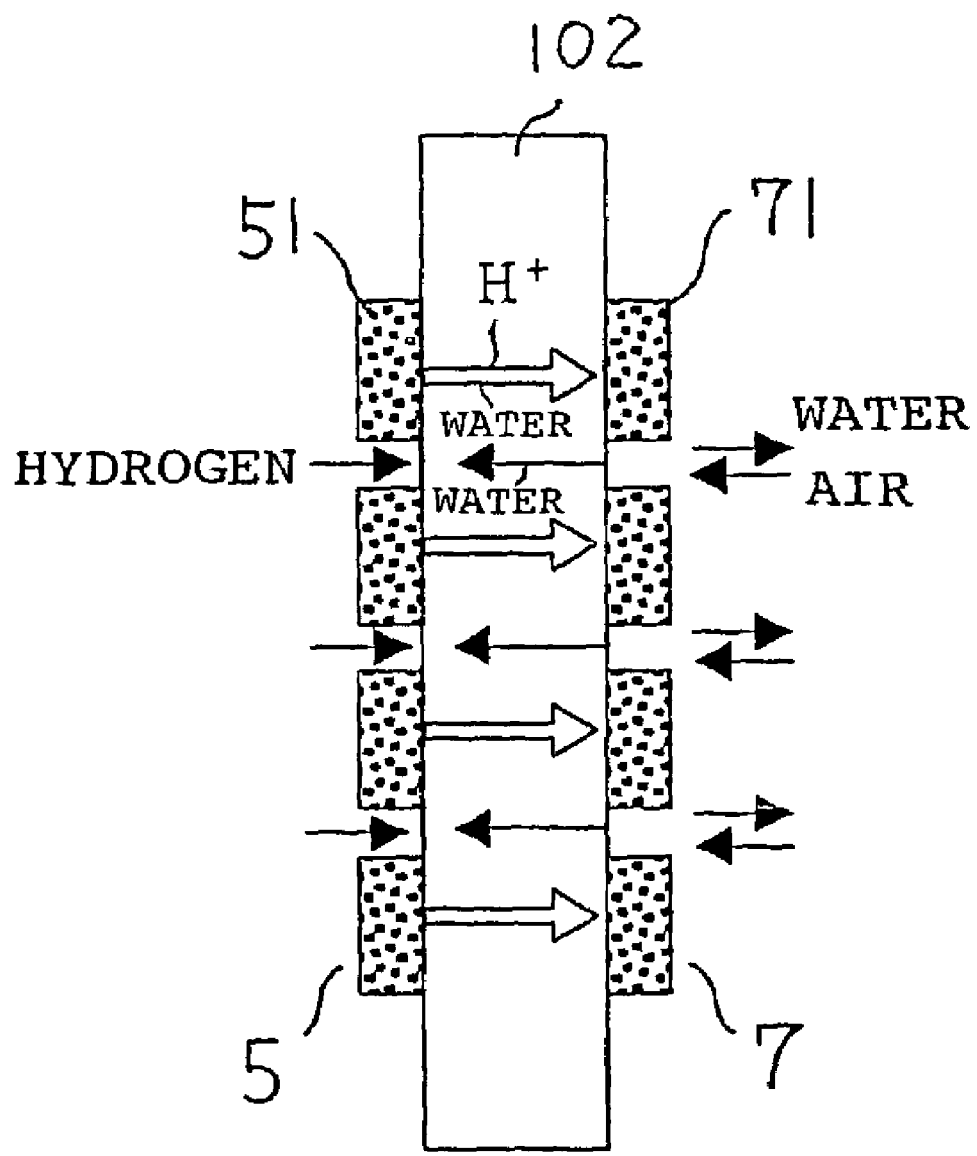
FIG. 2 is a view schematically illustrating a state in an electrolyte membrane during generation of electric power in the fuel cell in accordance with Embodiment 1 of the present invention.

In the fuel cell 1 with such a structure, the anode catalyst layer 5 has the divided catalyst segments 51, and the cathode catalyst layer 7 has the divided catalyst segments 71. Therefore, as shown in FIG. 2, in the anode catalyst layer 5, hydrogen as fuel directly reaches the interface between the divided catalyst segments 51 and the electrolyte membrane 102 where a reaction is most active, through the gaps between the divided catalyst segments 51, whereby hydrogen is likely to become hydrogen ions and electrons between the divided catalyst segments 51 and the electrolyte membrane 102. Furthermore, in the cathode catalyst layer 7, water generated in the reaction of the above-mentioned Formula (2) and water moved with hydrogen ions from the anode catalyst layer 5, are likely to be discharged through the gaps between the divided catalyst segments 71. Thus, air can be easily supplied to the interface between the divided catalyst segments 71 and the electrolyte membrane 102 where a reaction is most active due to the disturbance of the water. Furthermore, each of the divided catalyst segments 51 is opposite each of the divided catalyst segments 71. Therefore, hydrogen ions move from each of the divided catalyst segments 51 to each of the divided catalyst segments 71 via the electrolyte membrane 102. There is no metal catalyst between the gap of the respective divided catalyst segments 51 and the opposite gap of the respective divided catalyst segments 71. Therefore, there is no force allowing hydrogen ions to move from the anode catalyst layer 5 to the cathode catalyst layer 7. Thus, in this portion of the electrolyte membrane 102, the force caused by gradient of the water content becomes dominant, whereby water accumulated in the oxidant catalyst layer 7 moves to the anode catalyst layer 5. Because of this movement, the anode catalyst layer 5 is not dried, and water is retained therein, and an increase in an ion-conduction resistance of hydrogen ions is suppressed.

Furthermore, the electrolyte membrane 102 expands and contracts depending upon the temperature, humidity, or the like. However, the anode catalyst layer 5 and the cathode catalyst layer 7 have a plurality of divided catalyst segments 51 and 71, respectively. Therefore, the gaps between the divided catalyst segments 51 and the gaps between the divided catalyst segments 71 expand/contract to absorb a stress generated between the anode catalyst layer 5 and the electrolyte membrane 102 and between the cathode catalyst layer 7 and the electrolyte membrane 102, whereby the electrolyte membrane 102 is prevented from being damaged due to the stress acting thereon, the life of the divided catalyst segments 51 and 71 is prevented from being shortened due to a change in an internal structure caused by the stress acting on the divided catalyst segments 51 and 71, and the like.

Herein, in the case where the fuel cell 1 is kept at 80° C., a fuel channel 109 is supplied with humidified hydrogen by a bubbler (not shown) kept at 70° C., and an air channel 111 is supplied with humidified air by a bubbler kept at 70° C.

(i.e., in the case of a highly humidified state) under the same condition as that of the conventional example, the following results are obtained: the fuel cell 1 has 0.62 V/unit cell at a current density of 0.5 A/cm$^2$. Furthermore, in the case where hydrogen and air are similarly supplied by a bubbler kept at 70° C. with 100 ppm of carbon monoxide contained in the hydrogen, the following results are obtained: the fuel cell 1 has 0.55 V/unit cell at a current density of 0.5 A/cm$^2$. Furthermore, in the case where humidified hydrogen and air are supplied to the fuel cell 1 kept at 80° C. by a bubbler kept at 60° C. (i.e., in the case of a low humidified state), the following results are obtained: the fuel cell 1 has 0.52 V/unit cell at a current density of 0.5 A/cm$^2$.

In the case where only the anode catalyst layer 5 has the divided catalyst segments 51, hydrogen is directly supplied to the interface between the divided catalyst segments 51 and the electrolyte membrane 102 where a reaction is most active, from the gaps between the divided catalyst segments 51, and are likely to become hydrogen ions between the divided catalyst segments 51 and the electrolyte membrane 102. Furthermore, in the electrolyte membrane 102 with which the divided catalyst segments 51 are in contact, where hydrogen is likely to become hydrogen ions, a force for the hydrogen ions to be hydrated and move from the anode catalyst layer 5 to the cathode catalyst layer 7 becomes dominant. However, in portions of the electrolyte membrane 102 corresponding to the gaps between the respective divided catalyst segments 51, hydrogen is unlikely to become hydrogen ions. Therefore, a force due to the gradient of the water content becomes dominant, and water moves from the cathode catalyst layer 7 to the anode catalyst layer 5. Accordingly, the above-mentioned structure may be used.

In the case where only the cathode catalyst layer 7 has the divided catalyst segments 71, accumulated water is likely to be discharged from the gaps between the divided catalyst segments 71. In the electrolyte membrane 102 with which the divided catalyst segments 71 are in contact, where hydrogen ions are reacted to become water, a force for the hydrogen ions to be hydrated and move from the anode catalyst layer 5 to the cathode catalyst layer 7 becomes dominant. However, in portions of the electrolyte membrane 102 corresponding to the gaps between the divided catalyst segments 71, hydrogen ions are unlikely to react with oxygen in the air. Therefore, the hydrogen ions do not move to the gaps, and a force due to the gradient of the water content becomes dominant, whereby the hydrogen ions move from the cathode catalyst layer 7 to the anode catalyst layer 5. Thus, the above-mentioned structure may be used.

Furthermore, as long as there are gaps between the respective divided catalyst segments 51 of the anode catalyst layer 5 and between the respective divided catalyst segments 71 of the cathode catalyst layer 7, the same effects are exhibited. Therefore, division between the respective divided catalyst segments 51 and 71 may be incomplete instead of providing gaps that are continuous (e.g., a part of adjacent divided catalyst segments 51 may be connected, etc.).

Embodiment 2

Figure 3A:
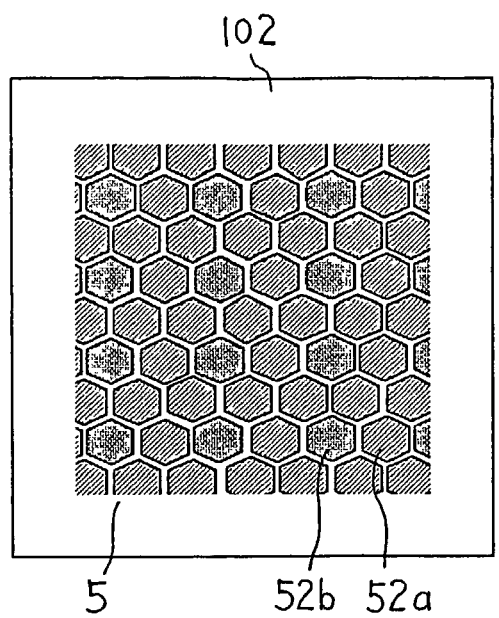
FIG. 3A is a front view seen from an anode side, schematically showing a structure of main portions of a fuel cell in accordance with Embodiment 2 of the present invention.
Figure 3B:
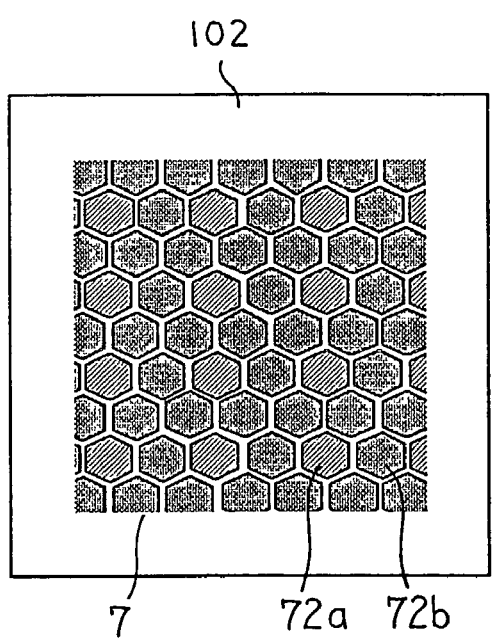
FIG. 3B is a front view thereof seen from a cathode side.
Figure 3C:
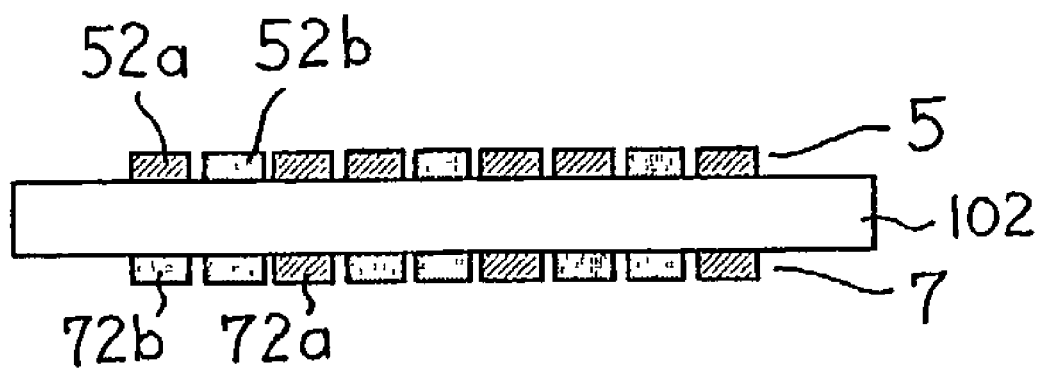
FIG. 3C is a side view thereof.

FIGS. 3A to 3C are views schematically showing a structure of main portions of a fuel cell in accordance with Embodiment 2 of the present invention. FIG. 3A is a front view seen from an anode side. FIG. 3B is a front view thereof seen from a cathode side. FIG. 3C is a side view thereof. In FIGS. 3A to 3C, a fuel cell 1 includes an electrolyte membrane 102, an anode 3 that is in contact with one surface of the electrolyte membrane 102, and a cathode 4 that is in contact with the other surface of the electrolyte membrane 102. The anode 3 includes an anode catalyst layer 5 applied to the electrolyte membrane 102, and a fuel-side gas diffusion layer 106 overlapped with the anode catalyst layer 5. The cathode 4 includes a cathode catalyst layer 7 applied to the electrolyte membrane 102, and the air-side gas diffusion layer 108 overlapped with the cathode catalyst layer 7.

The anode catalyst layer 5 includes hydrophilic divided catalyst segments 52a and water-repellent divided catalyst segments 52b with hydrophilicity smaller than that of the hydrophilic divided catalyst segments 52a. The divided catalyst segments 52a and 52b have the same shape and size as those of the divided catalyst segments 51 in Embodiment 1. The hydrophilic divided catalyst segments 52a are obtained, for example, by applying a solid polymer electrolyte with a weight twice that of Embodiment 1 to the electrolyte membrane 102 by the same method in Embodiment 1. The water-repellent divided catalyst segments 52b are obtained, for example, by impregnating carbon black with PTFE (Teflon (Trade Name)) fluid dispersion, drying the resultant carbon black, sintering it at 350° C. to obtain powder, and applying the powder to the electrolyte membrane 102 by the same method as that in Embodiment 1. Furthermore, the number of the hydrophilic divided catalyst segments 52a is three times that of the water-repellent divided catalyst segments 52b, and the total area of the hydrophilic divided catalyst segments 52a is three times that of the water-repellent divided catalyst segments 52b, as a whole. The hydrophilic divided catalyst segments 52a and each of the water-repellent divided catalyst segments 52b are applied uniformly to the surface of the electrolyte membrane 102.

The cathode catalyst layer 7 includes hydrophilic divided catalyst segments 72a and water-repellent divided catalyst segments 72b with hydrophilicity smaller than that of the hydrophilic divided catalyst segments 72a. The divided catalyst segments 72a and 72b have the same shape and size as those of the divided catalyst segments 71 in Embodiment 1. The hydrophilic divided catalyst segments 72a and the water-repellent divided catalyst segments 72b are produced, respectively, by the same methods as those of the hydrophilic divided catalyst segments 52a and the water-repellent divided catalyst segments 52b of the anode catalyst layer 5 to thereby be applied to the electrolyte membrane 102. Furthermore, the number of the hydrophilic divided catalyst segments 72a is ⅓ of that of the water-repellent divided catalyst segments 72b, and the total area of the hydrophilic divided catalyst segments 72a is ⅓ of that of the water-repellent divided catalyst segments 72b, as a whole. Each of the hydrophilic divided catalyst segments 72a and each of the water-repellent divided catalyst segments 72b are applied uniformly to the surface of the electrolyte membrane 102.

The fuel cell 1 with the above-mentioned structure exhibits the same effects as those of Embodiment 1. Furthermore, the hydrophilic divided catalyst segments 52a and 72a of the anode catalyst layer 5 and the cathode catalyst layer 7 are likely to contain and hold water. Therefore, in the case where the peripheries of the hydrophilic divided catalyst segments 52a and 72a are dried in a low humidified state, the electrolyte membrane 102 can be prevented from being dried by supplying water. Furthermore, the pores of the water-repellent divided catalyst segments 52b and 72b of the anode catalyst layer 5 and the cathode catalyst layer 7 are unlikely to be submerged in water. Therefore, in the case where water is accumulated in the water-repellent divided catalyst segments 52b and 72b in a highly humidified state, the pores of the divided catalyst segments 52b and 72b are secured, whereby hydrogen and air can be supplied smoothly to the electrolyte membrane 102.

Thus, the reactivity is satisfactory in the anode catalyst layer 5 and the cathode catalyst layer 7 both in a highly humidified state and a low humidified state; therefore, the fuel cell 1 can be used in a wide range of humidities. In general, the number of the hydrophilic divided catalyst segments 52a is set to be larger in the anode catalyst layer 5 that is likely to be dried, and the number of the water-repellent divided catalyst segments 72b is set to be larger in the cathode catalyst layer 7 in which water is likely to be accumulated. However, the movement of water in the electrolyte membrane 102 is varied depending upon the humidified state or the size of gaps between the divided catalyst segments. Therefore, the ratio between the total area of the hydrophilic divided catalyst segments 52a and that of the water-repellent divided catalyst segments 52b in the anode catalyst layer 5, and the ratio between the total area of the hydrophilic divided catalyst segments 72a and that of the water-repellent divided catalyst segments 72b in the cathode catalyst layer 7 can be arbitrarily selected depending upon the conditions such as a humidified state.

Herein, in the case where, under the same conditions as those of the conventional example, the fuel cell 1 is kept at 80° C., the fuel channel 109 is supplied with humidified hydrogen by a bubbler (not shown) kept at 70° C., and the air channel 111 is supplied with humidified air by a bubbler kept at 70° C. (i.e., in the case of a highly humidified state), the following results are obtained: the fuel cell 1 has 0.63 V/unit cell at a current density of 0.5 A/cm². Furthermore, in the case where humidified hydrogen and air are supplied by a bubbler kept at 60° C. to the fuel cell 1 kept at 80° C. (i.e., in the case of a low humidified state), the following results are obtained: the fuel cell 1 has 0.55 V/unit cell at a current density of 0.5 A/cm².

The hydrophilicity of each of the hydrophilic divided catalyst segments 52a and 72a may be adjusted, for example, by doubling the amount of a solid polymer electrolyte as described above. Alternatively, the hydrophilicity may be adjusted, for example, by mixing powder with hydrophilicity such as silica gel with carbon black. Furthermore, each of the water-repellent divided catalyst segments 52b and 72b may utilize water repellency of PTFE as described above. Alternatively, silicon-based powder with water repellency may be mixed with carbon black, for example.

Furthermore, the hydrophilicity of the anode catalyst layer 5 and the cathode catalyst layer 7 is varied, when the amount of a metal catalyst contained therein is varied. Therefore, merely by changing the amount of a metal catalyst contained in the respective divided catalyst segments 52a, 52b, 72a, and 72b, the hydrophilicity and water repellency of the respective divided catalyst segments can be changed easily.

Furthermore, as long as the hydrophilic divided catalyst segments 52a and the water-repellent divided catalyst segments 52b are applied only to the anode catalyst layer 5, the water-retention state and the fuel supply capacity of the anode catalyst layer 5 are enhanced. Therefore, the cathode catalyst layer 7 may be any cathode catalyst layer such as the conventional cathode catalyst layer or the cathode catalyst layer of Embodiment 1. Similarly, as long as the hydrophilic divided catalyst segments 72a and the water-repellent divided catalyst segments 72b are applied only to the cathode catalyst layer 7, air supply or discharge of accumulated water can be conducted smoothly in the cathode catalyst layer 7. Therefore, the anode catalyst layer 5 may be any anode catalyst layer.

Embodiment 3

Figure 4A:
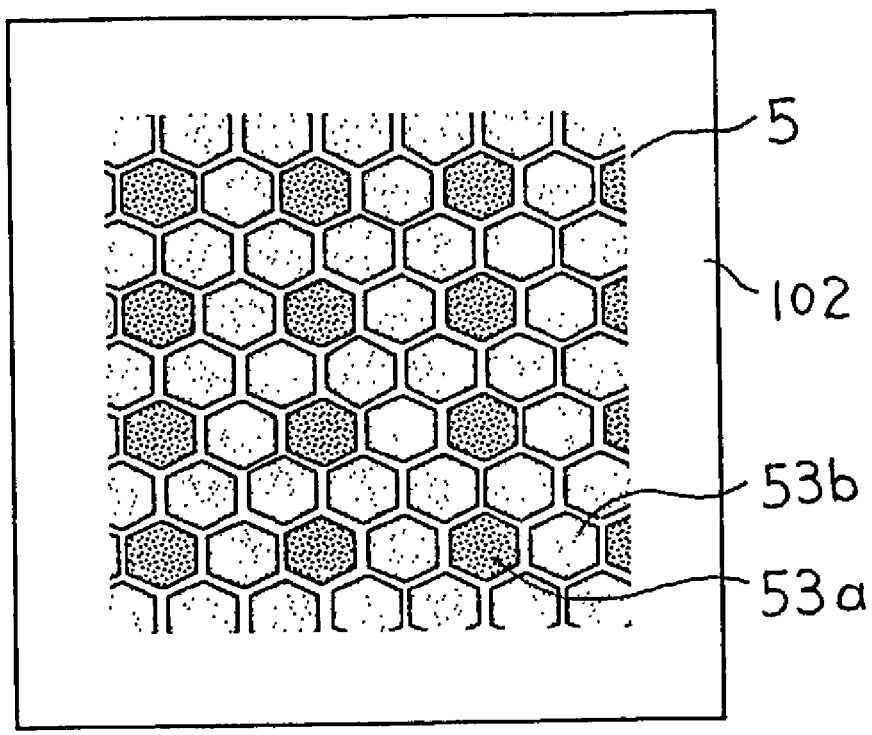
FIG. 4A is a front view seen from an anode side, schematically showing a structure of main portions of a fuel cell in accordance with Embodiment 3 of the present invention.
Figure 4B:
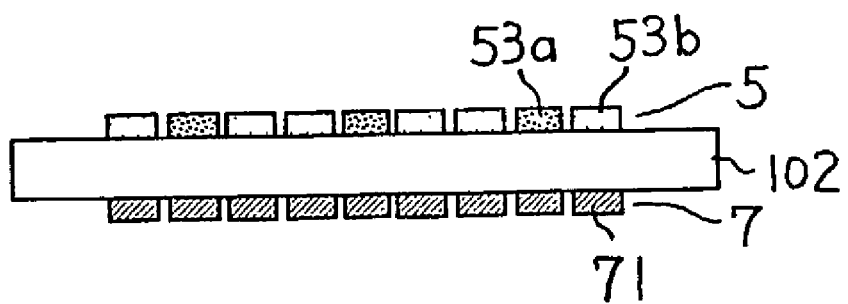
FIG. 4B is a side view thereof.

FIGS. 4A and 4B are views schematically showing a structure of main portions of a fuel cell in accordance with Embodiment 3 of the present invention. FIG. 4A is a front view seen from an anode side. FIG. 4B is a side view thereof. In FIGS. 4A and 4B, an anode catalyst layer 5 includes divided catalyst segments 53a and divided catalyst segments 53b, which have different compositions of a metal catalyst. In the divided catalyst segments 53a, a platinum-ruthenium alloy (atomic ratio between platinum and ruthenium=2:1) is used as a metallic catalyst. In the divided catalyst segments 53b, a platinum-ruthenium alloy (atomic ratio between platinum and ruthenium=1:2) is used as a metal catalyst. Furthermore, herein, the total area of the divided catalyst segments 53a is three times that of the divided catalyst segments 53b. The shape of each of the divided catalyst segments 53a and 53b or the gaps therebetween are the same as those in Embodiment 1, and the remaining structure is also the same as that of Embodiment 1.

The anode catalyst layer 5 is formed by applying the divided catalyst segments 53a to the electrolyte membrane 102, using carbon black to which powder of a platinum-ruthenium alloy (atomic ratio between platinum and ruthenium is 2:1) adheres, and applying the divided catalyst segments 53b to the electrolyte membrane 102, using carbon black to which a platinum-ruthenium alloy (atomic ratio between platinum and ruthenium is 1:2) adheres, by the same method as that in Embodiment 1.

Ruthenium is unlikely to adsorb carbon monoxide. Therefore, if the content of ruthenium in the platinum-ruthenium alloy is increased, the function of the platinum-ruthenium alloy as a catalyst can be maintained even for fuel containing carbon monoxide. However, when the content of ruthenium in the platinum-ruthenium alloy is increased, the content of platinum, which is excellent in functioning as a catalyst, is relatively decreased, which reduces the functionality of the entire platinum-ruthenium alloy as a catalyst. Therefore, it is suitable that a platinum-ruthenium alloy with a high content of ruthenium is used for fuel containing a large amount of carbon monoxide, whereas a platinum-ruthenium alloy with a low content of ruthenium is used for fuel containing a small amount of carbon monoxide.

Thus, the fuel cell 1 with the above-mentioned structure exhibits the same effects as those in Embodiment 1. Furthermore, even in the case where hydrogen gas containing carbon monoxide generated from natural gas or the like is used as fuel, the function as a catalyst can be maintained mainly by the divided catalyst segments 53b with a high content of ruthenium. Even in the case where hydrogen gas containing only pure hydrogen or a trace amount of carbon monoxide is used as fuel, the function as a catalyst can be exhibited mainly by the divided catalyst segments 53a with a low content of ruthenium. Even when the composition of fuel is changed, the function as a catalyst can be maintained.

Herein, in the case where, under the same conditions as those of the conventional example, the fuel cell 1 is kept at 80° C., the fuel channel 109 is supplied with humidified hydrogen containing 100 ppm of carbon monoxide by a bubbler (not shown) kept at 70° C., and the air channel 111 is supplied with humidified air by a bubbler kept at 70° C., the following results are obtained: the fuel cell 1 has 0.59 V/unit cell at a current density of 0.5 A/cm$^2$.

The content of ruthenium in the platinum-ruthenium alloy can be selected depending upon the change of the composition of fuel. Therefore, there is no limit to the above-mentioned ratio, and the ratio between the total area of the divided catalyst segments with a low content of ruthenium 53*a* and that of the divided catalyst segments 53*b* is not limited to the above-mentioned ratio. Furthermore, for example, a platinum-ruthenium alloy may be used for the divided catalyst segments with a high content of ruthenium 53*a*, and a platinum-molybdenum alloy may be used for the divided catalyst segments 53*b*. Thus, different kinds of metal catalysts with resistance to carbon monoxide may be used for the divided catalyst segments 53*a* and 53*b*, respectively.

Furthermore, for example, when a platinum-nickel alloy or the like is mixed as a metal catalyst with the divided catalyst segments 71 of the cathode catalyst layer 7, the reaction of the above-mentioned Formula (2) becomes active.

Herein, the cathode catalyst layer 7 is supplied with air through the air channel 111 as described above. The air having entered through an inlet of the air channel 111 is subjected to the reaction of Formula (2) at the interface between the cathode catalyst layer 7 and the electrolyte membrane 102, whereby oxygen in the air is consumed, and the air with a small content of oxygen is discharged from an outlet of the air channel 111. Accordingly, the amount of oxygen in the air is large in the vicinity of the inlet of the air channel 111, so that the amount of oxygen to be consumed is also large. However, in the vicinity of the outlet of the air channel 111, the air containing a small content of oxygen with oxygen consumed in the vicinity of the inlet is supplied, so that oxygen in the air cannot be consumed in a large amount. More specifically, the amount of oxygen to be consumed is varied depending upon the position in the cathode catalyst layer 7, and there is a tendency that a uniform reaction cannot be effected at the interface between the cathode catalyst layer 7 and the electrolyte membrane 102 as a whole. Because of this, in the vicinity of the inlet of the air channel 111 where a reaction is likely to be active, the temperature is increased due to reaction heat, and the metal catalyst contained in the cathode catalyst layer 7 is likely to be degraded. As a result, the life of the entire cathode catalyst layer 7 is also shortened. In order to prevent such inconvenience, the reaction of the above-mentioned Formula (2) may be uniformly effected in the entire cathode catalyst layer 7 by mixing a metal catalyst with a different composition with the divided catalyst segments 71. More specifically, for example, by mixing a platinum-nickel alloy with the divided catalyst segments 71 to make the atomic ratio between platinum and nickel different between the vicinity of the inlet of the air channel 111 and the vicinity of the outlet of the air channel 111 and make the reaction speed different, and adjusting the oxygen consumption amount in the vicinity of the inlet of the air channel 111 and that in the vicinity of the outlet to be uniform, the above-mentioned inconvenience can be prevented. The oxygen consumption amount may be made uniform by varying the kind of pure metal, instead of an alloy. Furthermore, it should be appreciated that the same effects can be obtained by varying the amount of a metal catalyst, even if it is of the same kind.

Embodiment 4

Figure 5A:
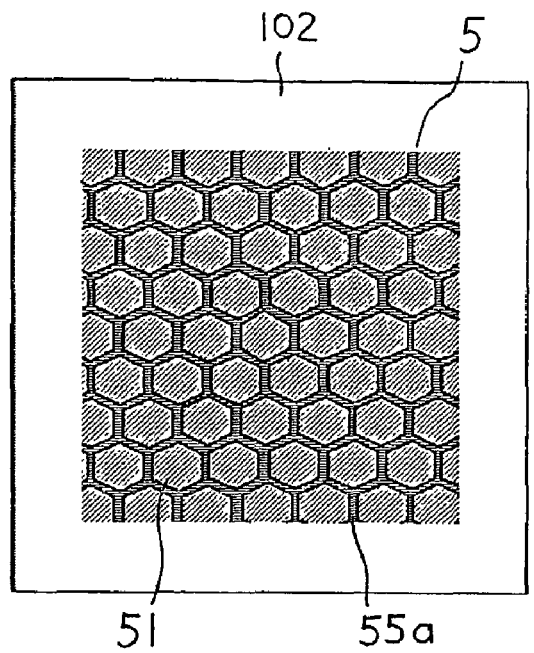
FIG. 5A is a front view seen from an anode side, schematically showing a structure of main portions of a fuel cell in accordance with Embodiment 4 of the present invention.
Figure 5B:
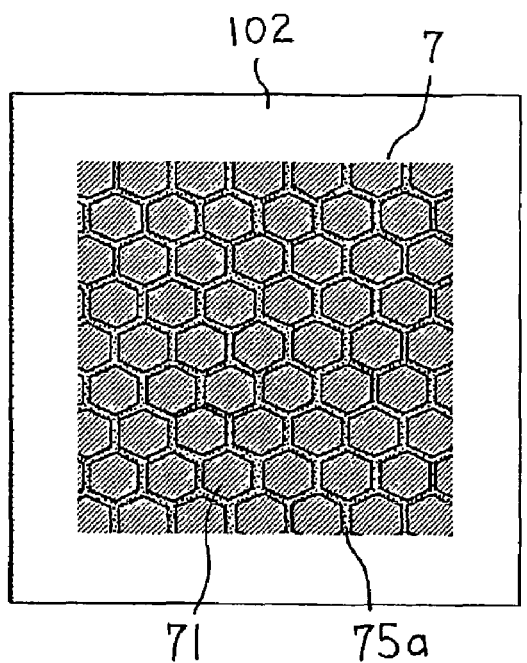
FIG. 5B is a front view thereof seen from a cathode side.
Figure 5C:
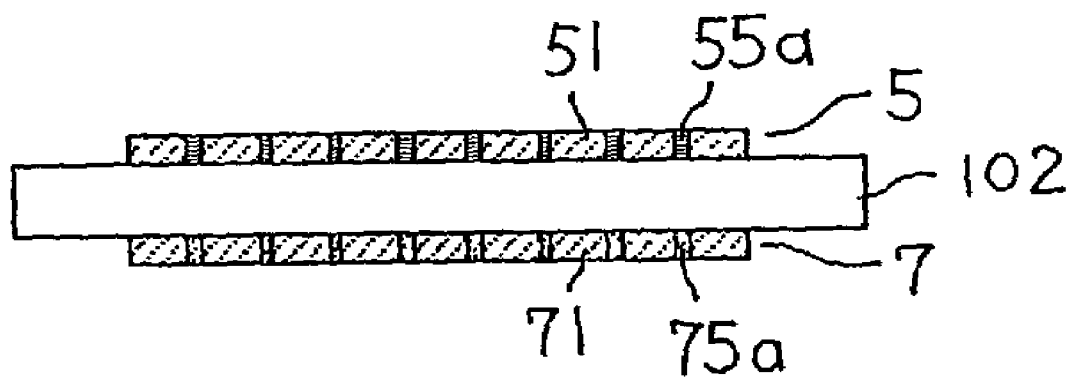
FIG. 5C is a side view thereof.

FIGS. 5A to 5C are views schematically showing a structure of main portions of a fuel cell in accordance with Embodiment 4 of the present invention. FIG. 5A is a front view seen from an anode side. FIG. 5B is a front view seen from a cathode side. FIG. 5C is a side view thereof. In FIGS. 5A to 5C, gaps between the respective divided catalyst segments 51 of an anode catalyst layer 5 are filled with a filling material 55*a* with hydrophilicity higher than that of the divided catalyst segments 51. Gaps between the respective divided catalyst segments 71 of a cathode catalyst layer 7 are filled with a filling material 75*a* having hydrophilicity lower than that of the divided catalyst segments 71 (i.e., having water repellency higher than that of the divided catalyst segments 71). The remaining structure is the same as that of Embodiment 1.

The filling material 55*a* of the anode catalyst layer 5 contains silica powder so as to enhance hydrophilicity. The filling material 55*a* is formed on the surface of an electrolyte membrane 102 by preparing an ink by mixing silica powder with an alcohol solution of a solid polymer electrolyte of perfluorosulfonic acid base, applying the ink to a PTFE sheet by screen printing, drying the ink, and thermally transferring the ink to the electrolyte membrane 102.

The filling material 75*a* of the cathode catalyst layer 7 contains PTFE powder so as to enhance water repellency. The filling material 75*a* is formed on the surface of the electrolyte membrane 102 by mixing PTFE powder with an alcohol solution of a solid polymer electrolyte of perfluorosulfonic acid type to prepare an ink and thereafter, following the same process as that of the filling material 55*a*.

The fuel cell 1 with the above-mentioned structure exhibits the same effects as those of Embodiment 1. Furthermore, the gaps between the divided catalyst segments 51 of the anode catalyst layer 5 are filled with the hydrophilic filling material 55*a*, whereby water is kept. Therefore, even in the case where the anode catalyst layer 5 and a portion where the anode catalyst layer 5 is in contact with the electrolyte membrane 102 enters a dried state due to a low humidified state, the filling material 55*a* keeping water can supply water to the surrounding divided catalyst segments 51 and the electrolyte membrane 102.

Furthermore, since the gaps between the divided catalyst segments 71 of the cathode catalyst layer 7 are filled with the water-repellent filling material 75*a*, even if water is accumulated in the cathode catalyst layer 7, the portion of the filling material 75*a* discharges the water, and air can be introduced smoothly to the interface between the divided catalyst segments 71 and the electrolyte membrane 102 through this portion.

Herein, in the case where, under the same conditions as those of the conventional example, the fuel cell 1 is kept at 80° C., the fuel channel 109 is supplied with humidified hydrogen by a bubbler (not shown) kept at 70° C., and the air channel 111 is supplied with humidified air by a bubbler kept at 70° C. (i.e., in the case of a highly humidified state), the following results are obtained: the fuel cell 1 has 0.64 V/unit cell at a current density of 0.5 A/cm$^2$. Furthermore, in the case where humidified hydrogen and air are supplied by a bubbler kept at 60° C. to the fuel cell 1 kept at 80° C. (i.e., in the case of a low humidified state), the following results are obtained: the fuel cell 1 has 0.57 V/unit cell at a current density of 0.5 A/cm$^2$.

The filling material 55*a* of the anode catalyst layer 5 can introduce hydrogen gas as fuel to the interface between the divided catalyst segments 51 and the electrolyte membrane 102 through the filling material 55*a* in the case where water is accumulated in the anode catalyst layer 5, depending upon the conditions such as a humidified state or the size of the gaps between divided catalyst segments 51. Therefore, the filling material 55*a* may have water repellency.

Furthermore, similarly, in the case where the cathode catalyst layer 7 is dried, the filling material 75*a* of the cathode catalyst layer 7 can supply water to the peripheral divided catalyst segments 71 and the electrolyte membrane 102. Therefore, the filling material 75*a* may have hydrophilicity.

Furthermore, the filling material 55*a* or 75*a* may be used for only one of the anode catalyst layer 5 and the cathode catalyst layer 7, for the above-mentioned reasons.

Embodiment 5

Figure 6A:
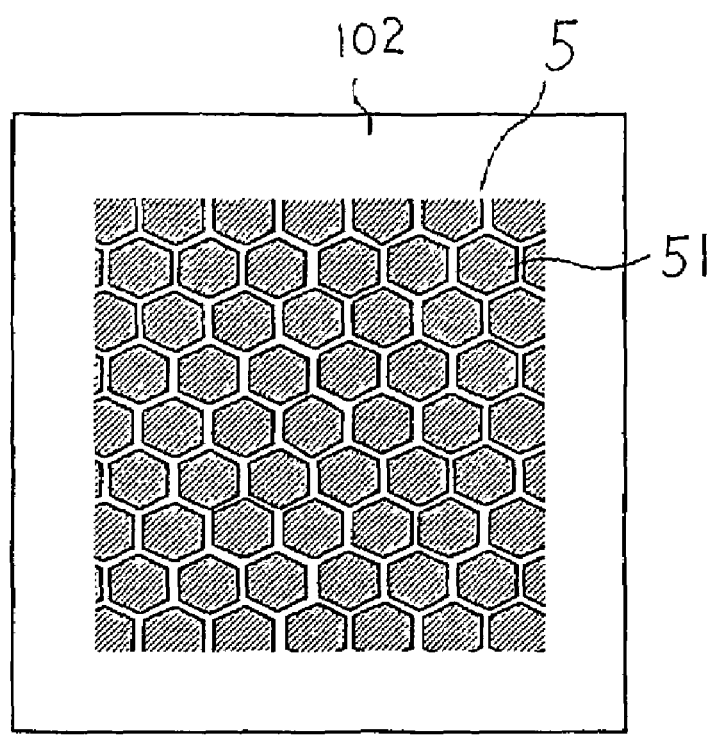
FIG. 6A is a top view schematically showing a structure of main portions of a fuel cell in accordance with Embodiment 5 of the present invention.
Figure 6B:
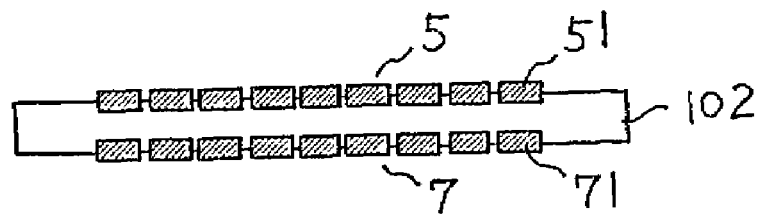
FIG. 6B is a side-sectional view thereof.

FIGS. 6A and 6B are views schematically showing a structure of main portions of a fuel cell in accordance with Embodiment 5 of the present invention. FIG. 6A is a top view, and FIG. 6B is a side cross-sectional view. In FIGS. 6A and 6B, divided catalyst segments 51 of an anode catalyst layer 5 and divided catalyst segments 71 of a cathode catalyst layer 7 are partially embedded in an electrolyte membrane 102, respectively. The remaining structure is the same as that of Embodiment 1.

The divided catalyst segments 51 and 71 are applied to the electrolyte membrane 102 in the same way as in Embodiment 1. When these portions are heat-sealed to the electrolyte membrane 102, a press pressure is enhanced, whereby the bottom surfaces of the respective divided catalyst segments 51 and 71 are embedded in the electrolyte membrane 102.

The fuel cell 1 with the above-mentioned structure exhibits the same effects as those of Embodiment 1. Furthermore, the divided catalyst segments 51 and 71 are partially embedded in the electrolyte membrane 102. Therefore, the distance between the divided catalyst segments 51 and the divided catalyst segments 71 is smaller than the thickness of the electrolyte membrane 102, whereby hydrogen ions and water can move easily. Furthermore, the contact area between the divided catalyst segments 51 and 71 and the electrolyte membrane 102 is larger than that in Embodiment 1, whereby the reaction areas in the above-mentioned Formulae (1) and (2) are increased, and electric power can be generated efficiently.

Herein, in the case where, under the same conditions as those of the conventional example, the fuel cell 1 is kept at 80° C., the fuel channel 109 is supplied with humidified hydrogen by a bubbler (not shown) kept at 70° C., and the air channel 111 is supplied with humidified air by a bubbler kept at 70° C., the following results are obtained: the fuel cell 1 has 0.63 V/unit cell at a current density of 0.5 A/cm².

Embodiment 6

Figure 7A:
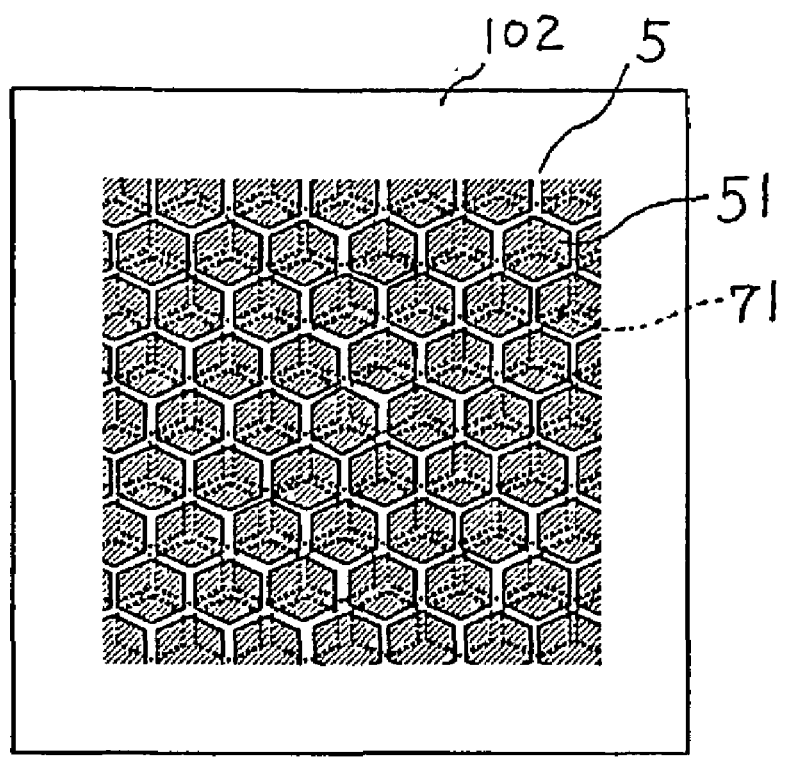
FIG. 7A is a front view seen from an anode side, schematically showing a structure of main portions of a fuel cell in accordance with Embodiment 6 of the present invention.
Figure 7B:
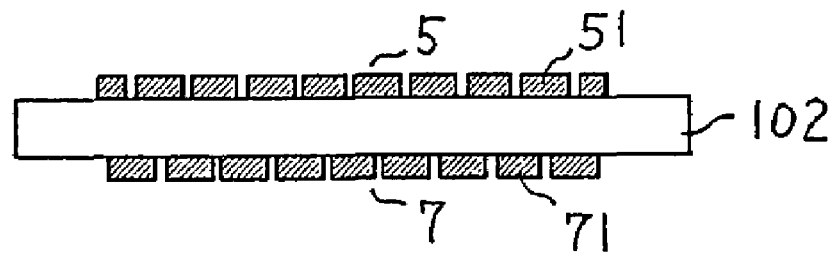
FIG. 7B is a side view thereof.

FIGS. 7A and 7B are views schematically showing a structure of main portions of a fuel cell in accordance with Embodiment 6 of the present invention. FIG. 7A is a front view seen from an anode side, and FIG. 7B is a side view thereof. In FIGS. 7A and 7B, the respective divided catalyst segments 51 of an anode catalyst layer 5 are not completely opposed to the respective divided catalyst segments 71 of a cathode catalyst layer 7 via an electrolyte membrane 102. The divided catalyst segments 51 are applied to the electrolyte membrane 102 so as to be slightly shifted from the divided catalyst segments 71. More specifically, gaps between the divided catalyst segments 71 of the cathode catalyst layer 7 are present at portions opposed to the divided catalyst segments 51 via the electrolyte membrane 102, and the divided catalyst segments 51 are opposed to at least two divided catalyst segments 71. In FIGS. 7A and 7B, the divided catalyst segments 51 are opposed to three divided catalyst segments 71. The remaining structure is the same as that of Embodiment 1.

The fuel cell 1 with the above-mentioned structure exhibits the same effects as those of Embodiment 1. Furthermore, portions of the electrolyte membrane 102 where at least one of the divided catalyst segments 51 and 71 is attached to the electrolyte membrane 102 have mechanical strength higher than that of the portions where the gaps between the divided catalyst segments 51 of the anode catalyst layer 5 are completely opposed to the gaps between the divided catalyst segments 71 of the cathode catalyst layer 7 (i.e., the portions where only the electrolyte membrane 102 is present). Therefore, the electrolyte membrane 102 is supported by the divided catalyst segments 51 and 71 as a whole, and its mechanical strength is enhanced.

Herein, in the case where, under the same conditions as those of the conventional example, the fuel cell 1 is kept at 80° C., the fuel channel 109 is supplied with humidified hydrogen by a bubbler (not shown) kept at 70° C., and the air channel 111 is supplied with humidified air by a bubbler kept at 70° C., the following results are obtained: the fuel cell 1 has 0.62 V/unit cell at a current density of 0.5 A/cm².

Even in a structure in which only one of the divided catalyst segments 51 and 71 is embedded in the electrolyte membrane 102, instead of a structure in which both of the divided catalyst segments 51 and 71 are embedded in the electrolyte membrane 102, the same effects can be exhibited.

As is apparent from the above description, the fuel cell of the present invention includes an electrolyte membrane, an anode provided on one surface of the electrolyte membrane and having a catalyst layer that is supplied with fuel and contains a metal catalyst, and a cathode provided on the other surface of the electrolyte membrane and having a catalyst layer that is supplied with an oxidant and contains a metal catalyst. At least one of the catalyst layer of the anode and the catalyst layer of the cathode is composed of a plurality of divided catalyst segments, and gaps are present between the divided catalyst segments adjacent to each other. Therefore, in the gaps, the fuel is unlikely to become ions, and the number of ions moving from the anode to the cathode through the electrolyte membrane is decreased. Water accumulated in the cathode moves from the cathode to the anode due to the gradient of the water content. Therefore, drying of the anode and accumulation of water in the cathode can be prevented.

Furthermore, the catalyst layer is composed of at least two kinds of the divided catalyst segments with different hydrophilicities. Therefore, the function as a catalyst of the divided catalyst segments can be maintained under a wide range of humidified conditions.

Furthermore, the respective divided catalyst segments with different hydrophilicities contain the metal catalysts in different amounts. Therefore, the divided catalyst segments with different hydrophilicities can be formed without adding hydrophilic or water-repellent material to the divided catalyst segments.

Furthermore, at least one of the divided catalyst segments of the anode or the divided catalyst segments of the cathode contain at least two kinds of the divided catalyst segments with different compositions of the metal catalysts. Therefore, in the divided catalyst segments of the anode, even if the composition of the fuel is changed, the function as a catalyst of the entire anode catalyst layer can be maintained. In the divided catalyst segments of the cathode, even in the case where the concentration of the oxidant is varied based on the position of the cathode in the catalyst layer, the non-uniformity of the reaction caused by the difference in concentration of oxidant is decreased, whereby a uniform reaction can be conducted in the entire cathode, and a high-temperature portion is generated in the cathode catalyst layer to suppress the catalyst layer from being degraded. This can prolong the life of the catalyst layer.

Furthermore, in the catalyst layer, the gaps between the divided catalyst segments are filled with a filling material having a hydrophilicity different from that of the divided catalyst segments. Therefore, in the case where the catalyst layer is dried, the filling material supplies water to the peripheral divided catalyst segments and the electrolyte membrane. In the case where water is accumulated in the catalyst layer, the filling material discharges water to keep a path for introducing the fuel or the oxidant to the electrolyte membrane.

Furthermore, the divided catalyst segments of the anode are opposed to at least a part of the gaps between the divided catalyst segments of the cathode. Therefore, the area where only the electrolyte membrane is present is decreased, and the mechanical strength of the electrolyte membrane is enhanced since it is supported by the divided catalyst segments.

Furthermore, at least one of the anode catalyst layer of the anode or the cathode catalyst layer is partially embedded in the electrolyte membrane. Therefore, the distance between the catalyst layer of the anode and the catalyst layer of the cathode is decreased. As a result, ions and water can easily move, and the contact area between the catalyst layer and the electrolyte membrane is increased to enlarge a reaction area, whereby electric power can be generated efficiently.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A fuel cell comprising:
   an electrolyte membrane having opposed first and second surfaces;
   an anode disposed on the first surface of the electrolyte membrane, wherein
   the anode comprises a plurality of mutually spaced apart anode segments,
   nearest anode segments are separated by gaps defined by side surfaces of the anode segments and a portion of the first surface of the electrolyte membrane between the anode segments,
   each anode segment contains a first metal catalyst, and
   a first group of the anode segments has a first hydrophilicity and a second group of the anode segments has a second hydrophilicity, different from the first hydrophilicity; and
   a cathode disposed on the second surface of the electrolyte membrane.

2. The fuel cell according to claim 1, wherein the first group of anode segments includes the first metal catalyst in a first concentration and the second group of anode segments includes the first metal catalyst in a second concentration, different from the first concentration, producing the first and second hydrophilicities, respectively.

3. The fuel cell according to claim 1, wherein the first hydrophilicity is higher than the second hydrophilicity and the first group of anode segments covers an area of the first surface of the electrolyte membrane larger than the area of the first surface of the electrolyte membrane covered by the second group of anode segments.

4. The fuel cell according to claim 1, wherein the anode segments are partially embedded in the first surface of the electrolyte membrane.

5. The fuel cell according to claim 1, wherein
   the cathode comprises a plurality of mutually spaced apart cathode segments,
   nearest cathode segments are separated by gaps defined by side surfaces of the cathode segments and a portion of the second surface of the electrolyte membrane between the cathode segments, and
   each of the cathode segments contains a second metal catalyst.

6. The fuel cell according to claim 5, wherein a first group of the cathode segments has a third hydrophilicity and a second group of the cathode segments has a fourth hydrophilicity, different from the third hydrophilicity.

7. The fuel cell according to claim 6, wherein the first group of cathode segments includes the second metal catalyst in a first concentration and the second group of cathode segments includes the second metal catalyst in a second concentration, different from the first concentration of the second metal catalyst, producing the third and fourth hydrophilicities, respectively.

8. The fuel cell according to claim 6, wherein the third hydrophilicity is higher than the fourth hydrophilicity and the second group of cathode segments covers an area of the second surface of the electrolyte membrane larger than the area of the second surface of the electrolyte membrane covered by the first group of cathode segments.

9. The fuel cell according to claim 5, wherein the anode segments on the first surface of the electrolyte membrane are directly opposite corresponding cathode segments on the second surface of the electrolyte membrane.

10. The fuel cell according to claim 5, wherein the anode segments on the first surface of the electrolyte membrane are not directly opposite corresponding cathode segments on the second surface of the electrolyte membrane.

11. The fuel cell according to claim 5, wherein the anode segments are partially embedded in the first surface of the electrolyte membrane.

12. The fuel cell according to claim 11, wherein the cathode segments are partially embedded in the second surface of the electrolyte membrane.

13. A fuel cell comprising:
   an electrolyte membrane having opposed first and second surfaces;
   a cathode disposed on the second surface of the electrolyte membrane, wherein
   the cathode comprises a plurality of mutually spaced apart cathode segments,
   nearest cathode segments are separated by gaps defined by side surfaces of the cathode segments and a portion of the second surface of the electrolyte membrane between the cathode segments,
   each cathode segment contains a metal catalyst, and
   a first group of the cathode segments has a first hydrophilicity and a second group of the cathode segments has a second hydrophilicity, different from the first hydrophilicity; and
   an anode disposed on the first surface of the electrolyte membrane.

14. The fuel cell according to claim 13, wherein the first group of cathode segments include the metal catalyst in a first concentration and the second group of cathode segments include the metal catalyst in a second concentration, different from the first concentration, producing the first and second hydrophilicities, respectively.

15. The fuel cell according to claim 13, wherein the first hydrophilicity is smaller than the second hydrophilicity and the first group of cathode segments covers an area of the second surface of the electrolyte membrane larger than the area of the second surface of the electrolyte membrane covered by the second group of cathode segments.

16. The fuel cell according to claim 13, wherein the cathode segments are partially embedded in the second surface of the electrolyte membrane.

* * * * *